(12) United States Patent
Bockelmann et al.

(10) Patent No.: US 7,564,213 B2
(45) Date of Patent: Jul. 21, 2009

(54) BATTERY CONTROL SYSTEM FOR HYBRID VEHICLE AND METHOD FOR CONTROLLING A HYBRID VEHICLE BATTERY

(75) Inventors: Thomas R. Bockelmann, Battle Creek, MI (US); Kevin D. Beaty, Kalamazoo, MI (US); Zhanijang Zou, Battle Creek, MI (US); Xiaosong Kang, Battle Creek, MI (US)

(73) Assignee: Eaton Corporation, Cleveland, OH (US)

( * ) Notice: Subject to any disclaimer, the term of this patent is extended or adjusted under 35 U.S.C. 154(b) by 293 days.

(21) Appl. No.: 10/917,575

(22) Filed: Aug. 13, 2004

(65) Prior Publication Data

US 2006/0033469 A1    Feb. 16, 2006

(51) Int. Cl.
*H02J 7/00* (2006.01)
*H02J 7/04* (2006.01)
(52) U.S. Cl. .................. 320/104; 320/132; 320/149
(58) Field of Classification Search .............. 320/104, 320/134, 132
See application file for complete search history.

(56) References Cited

U.S. PATENT DOCUMENTS

| | | | |
|---|---|---|---|
| 5,656,921 A | 8/1997 | Farrall | |
| 5,842,534 A | 12/1998 | Frank | |
| 6,163,135 A * | 12/2000 | Nakayama et al. | 320/150 |
| 6,304,055 B1 | 10/2001 | Winstead | |
| 6,583,599 B1 * | 6/2003 | Phillips et al. | 320/104 |
| 2004/0108831 A1 * | 6/2004 | Cartwright et al. | 320/104 |
| 2004/0119441 A1 | 6/2004 | Koo | |

FOREIGN PATENT DOCUMENTS

EP    1008484 A2    6/2000

* cited by examiner

*Primary Examiner*—Akm Enayet Ullah
*Assistant Examiner*—Alexis Boateng
(74) *Attorney, Agent, or Firm*—Dykema Gossett PLLC

(57) ABSTRACT

A battery control system for controlling a state of charge of a hybrid vehicle battery includes a detecting arrangement for determining a vehicle operating state or an intended vehicle operating state and a controller for setting a target state of charge level of the battery based on the vehicle operating state or the intended vehicle operating state. The controller is operable to set a target state of charge level at a first level during a mobile vehicle operating state and at a second level during a stationary vehicle operating state or in anticipation of the vehicle operating in the stationary vehicle operating state. The invention further includes a method for controlling a state of charge of a hybrid vehicle battery.

16 Claims, 3 Drawing Sheets

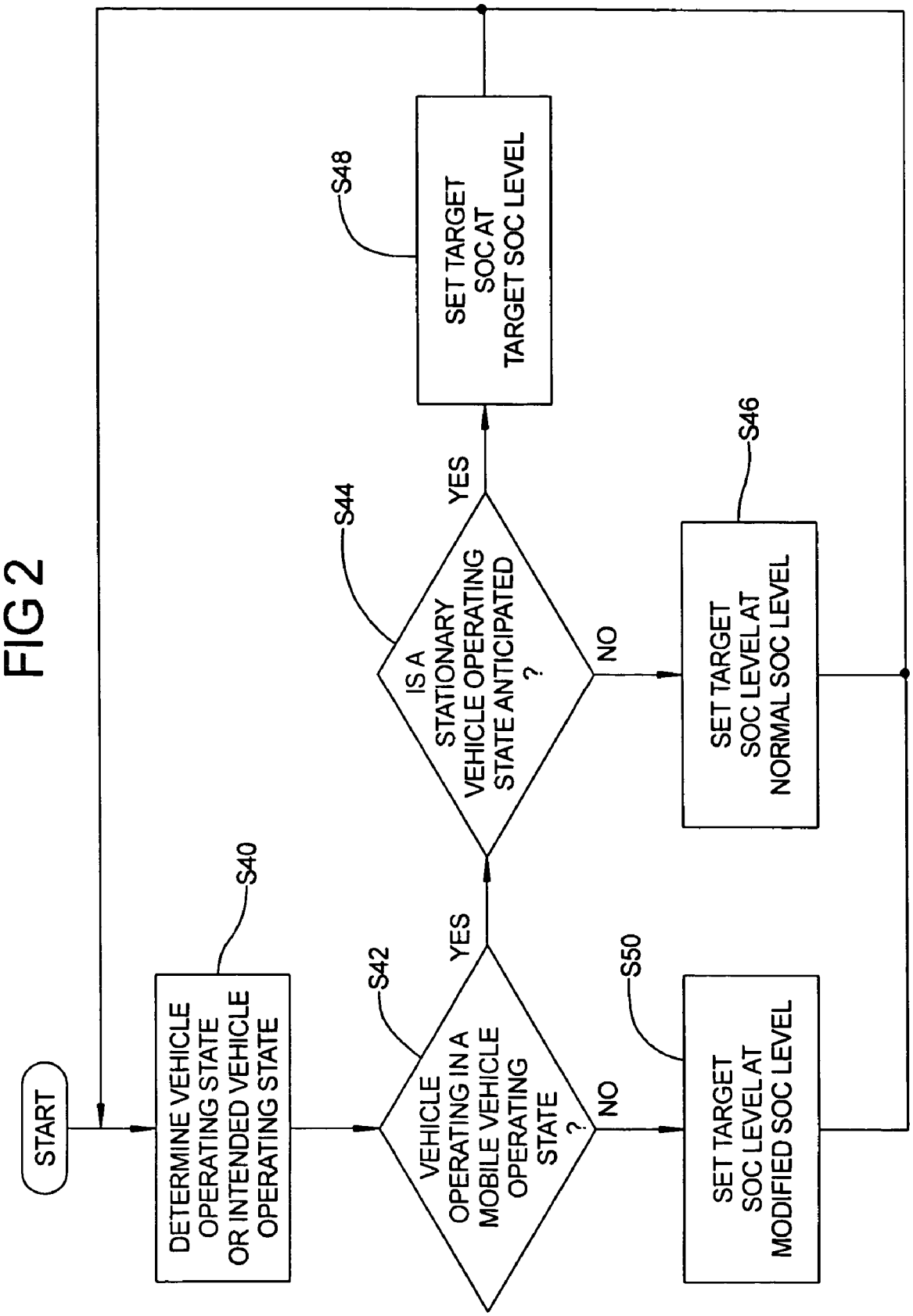

BATTERY CONTROL SYSTEM FOR HYBRID VEHICLE AND METHOD FOR CONTROLLING A HYBRID VEHICLE BATTERY

This invention was made with Government support under NREL Subcontract No. ZCL-2-32060-01, Prime Contract DE-AC36-99GO10337 awarded by the Department of Energy. The government has certain rights in this invention.

BACKGROUND OF THE INVENTION

1. Field of the Invention

The present invention relates generally to hybrid motor vehicles and, more particularly, to a battery control system for controlling the state of charge of a hybrid vehicle battery.

2. Background of the Invention

Motor vehicle manufacturers are actively working to develop alternative powertrain systems in an effort to reduce the level of pollutants exhausted into the air by conventional powertrains equipped with internal combustion engines. Significant development efforts have been directed to electric and fuel-cell vehicles. Unfortunately, these alternative powertrain systems suffer from several disadvantages and, for all practical purposes, are still under development. However, "hybrid" vehicles, which are equipped with an internal combustion engine and an electric motor that can be operated independently or in combination with the internal combustion engine to provide motive power to the vehicle, offer a compromise between traditional internal combustion engine powered vehicles and full electric powered vehicles.

A hybrid vehicle is typically equipped with a battery (a main battery) that provides electrical power to the hybrid driving motor and, in turn, is charged by a generator (typically the hybrid drive motor operating as a generator to generate electrical energy from a mechanical input). A battery charge level is monitored according to an index known as the battery State of Charge, or SOC. The SOC is defined by a ratio of the amount of residual charge remaining in a battery relative to its full charge capacity. Presently, a battery's SOC is generally measured using a combination of a measurement method utilizing a correlation between SOC and a battery's voltage-current characteristics at the time of charging (or discharging) and a measurement method utilizing an accumulation of charged and discharged amounts.

In hybrid vehicles, a battery control system typically controls charging and discharging of a battery based on the SOC. Specifically, for charging and discharging control, SOC values are typically divided into at least three ranges, namely, a charging prohibited range, a discharging prohibited range, and a normally charged range. In a charging prohibited range (e.g., SOC about 70 to 100%), further charging may be prohibited to leave room for energy capture through regenerative braking and to avoid excessive charging that could damage the battery. In a discharging prohibited range (e.g., SOC about 0 to 30%), further discharging may be prohibited to prevent excessive discharging that could compromise normal operation of the hybrid powertrain system. In a normally charged range (e.g., SOC about 30 and 70%), excessive charging or discharging are both unlikely and, therefore, charging and discharging are both allowed.

The preceding SOC strategy, while satisfactory for operating a passenger vehicle, may not be suitable for hybrid vehicles that operate the hybrid powertrain system to produce on-board of off-board power. For example, hybrid passenger vehicles use energy from the battery to enhance dynamic performance, convert kinetic energy into electric energy using regenerative braking, and store the converted energy in a battery to improve power consumption. In addition to these features, hybrid utility vehicles, such as utility trucks, may be operated to produce off-board electric or hydraulic power by operating the electric motor to produce electrical energy to drive a hydraulic pump, or use the electrical energy stored in the main battery to power on-board or off-board electrical equipment. In the latter example, it may be desirable to modify the SOC level during certain vehicle operating states (e.g., stationary vehicle supplying off-board electrical power) to maximize the energy available in the main battery and to minimize the need to activate the internal combustion to recharge the main battery or supplement the power provided thereby.

SUMMARY OF THE INVENTION

The present invention includes, among other things, a battery control system for controlling a state of charge of a hybrid vehicle battery. The battery control system includes a detecting arrangement for determining a vehicle operating state or an intended vehicle operating state and a controller for setting a target state of charge level of the battery based on the vehicle operating state or the intended vehicle operating state. In an embodiment, the controller is operable to set a target state of charge level at a first level during a mobile vehicle operating state and at a second level during a stationary vehicle operating state or in anticipation of the vehicle operating in the stationary vehicle operating state. The invention further includes a method for controlling a state of charge of a hybrid vehicle battery.

BRIEF DESCRIPTION OF THE DRAWINGS

Embodiments of the invention will now be described, by way of example, with reference to the accompanying drawings, wherein:

FIG. 2 is a flowchart illustrating a method for controlling the SOC of a hybrid vehicle battery according to an embodiment of the present invention.

DETAILED DESCRIPTION

Figure 1:
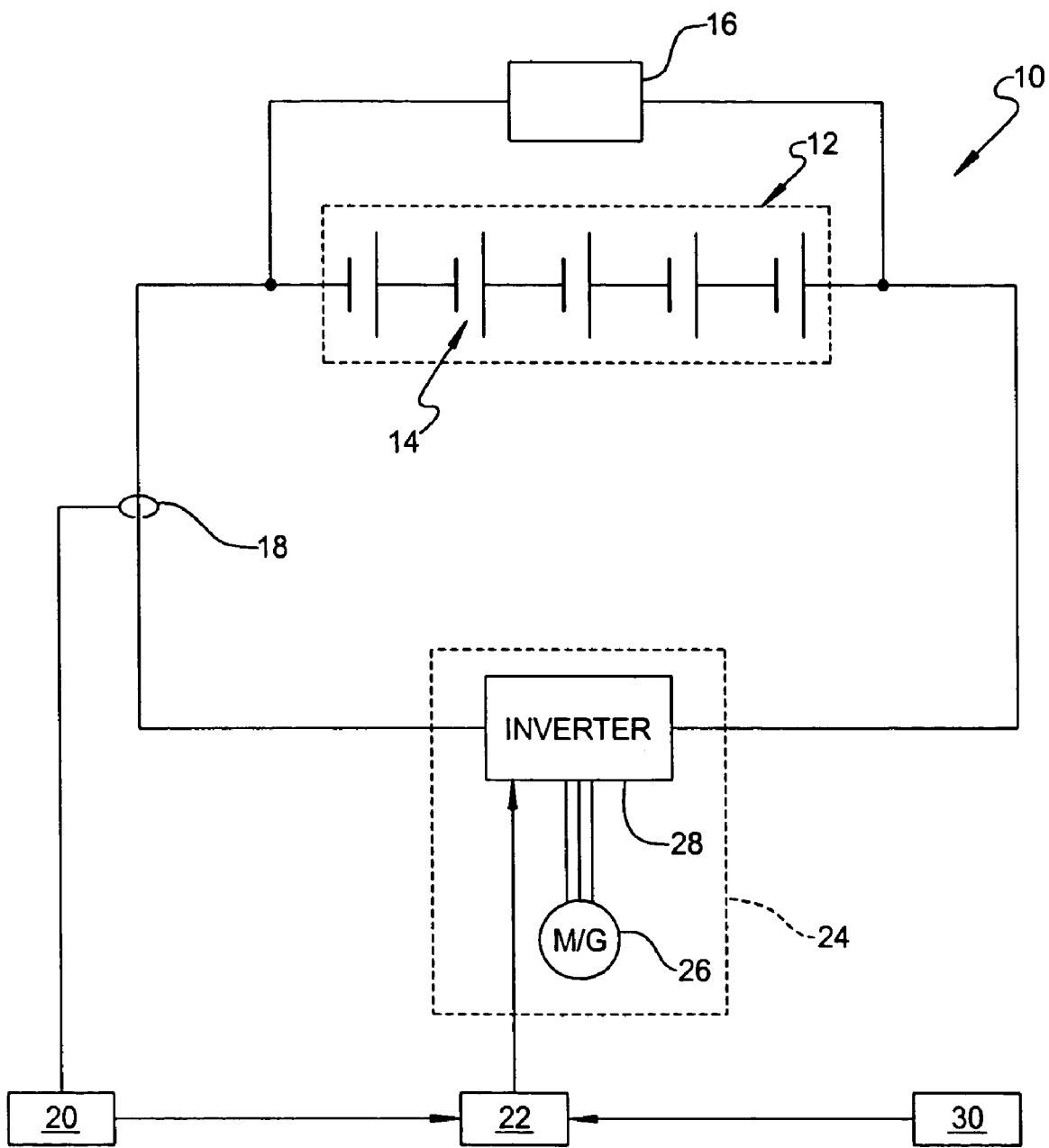
FIG. 1 is a block diagram schematically illustrating the overall structure of a battery control system according to an embodiment of the present invention.

FIG. 1 is a block diagram schematically showing the overall structure of a battery control system 10 for a hybrid vehicle according to an embodiment of the present invention. In the illustrated embodiment, battery control system 10 includes a main battery 12, such as a Nickel Metal Hydrogen (NiMH) battery or the like. Among other configurations, battery 12 may be a combination battery that includes a plurality of serially connected battery cells 14, from which a high voltage, for example 340 V, is obtainable. However, it will be appreciated that battery 12 may include any number of cells or even no "cells" at all.

As shown in FIG. 1, the voltage in battery 12 may be measured by a voltage sensor 16 and a current sensor 18 may be used to measure charged and discharged current with respect to battery 10. In an embodiment, the voltage and current measurements are supplied to a battery control unit (BCU) 20, such as an electronic control unit. BCU 20 accumulates charged or discharged voltage and current measurements with respect to battery 12 for determination of the State of Charge (SOC) of battery 12.

In an embodiment, BCU 20 outputs the determined SOC to a hybrid vehicle control unit (HVCU) 22, such as an electronic control unit. Based on the SOC input from BCU 20, the HVCU 22 controls operation of a hybrid prime mover 24 that includes, among other things, a traction motor-generator 26 and an inverter 28. Power from battery 12 is supplied to motor-generator 26 via inverter 28 and power generated by motor-generator 26 is supplied to battery 12 via inventor 28.

Operation of a hybrid vehicle employing battery control system 10 may be characterized by any number of operating states. In an embodiment of the invention, a first vehicle operating state may occur when the vehicle is moving and, accordingly, may be deemed a mobile vehicle operating state. In a mobile vehicle operating state, for example, prime mover 24 may be operated alone or in combination with an internal combustion engine (not shown) to move the vehicle. Alternatively, a second vehicle operating state may occur when the vehicle is stationary and, accordingly, may be deemed a stationary vehicle operating state. In a stationary vehicle operating state, for example, battery 12 may be used to supply electrical power to on-board or off-board equipment while the vehicle is parked and the engine is turned off.

As noted above, hybrid vehicle batteries are typically operated within a predetermined normal SOC range (e.g., about 30%-70%), which facilitates extended battery life under the relatively high charge and discharge currents required by the hybrid drive motor and leaves room for additional energy recovery during the mobile vehicle operating state. As proposed by the present invention, different SOC levels may be associated with different vehicle operating states to provide for a more efficient use of vehicle energy resources, particularly when it is determined or anticipated that enhanced battery storage capacity is or will be desired. For example, a hybrid powertrain system employed in a utility vehicle may be operated in a stationary vehicle operating state to support the energy demands of off-board power equipment or on-board vehicle systems and, therefore, may benefit from an increase in at least the upper limit of the SOC level and a corresponding increase in the battery storage capacity. Aside from intentionally charging battery 12 by operating motor-generator 26 as an engine-powered generator, there is virtually no opportunity for regenerative braking while the hybrid vehicle is operating in the stationary operating state. As such, modifying the SOC level would enable more electrical energy to be stored in a given size battery and would minimize the need to start the internal combustion engine to drive the motor-generator 26 to charge battery 12.

In an embodiment of the present invention, the SOC level may be maintained at a first predetermined or normal level when the vehicle is operating in a mobile vehicle operating state (e.g., while the vehicle is being driven on a highway). In anticipation of the vehicle operating in a stationary vehicle operating state or when it is determined that the vehicle is operating in a stationary vehicle operating state (e.g., the vehicle is parked at a work site providing on-board or off-board power), the SOC level may be increased to a second level that is closer than the first level to an upper limit of a maximum SOC of battery 12 to effectively increase the storage capacity of battery 12.

To facilitate modification of the SOC level, battery control system 10 may include a detecting arrangement 30 for determining a vehicle operating state or intended vehicle operating state. In an embodiment, detecting arrangement 30 includes a manually activated switch that allows a vehicle operator to prepare for stationary, engine-off vehicle operation or provide an indication that the vehicle is parked. Once actuated, the switch may provide a signal to HVCU 22 or another system controller (e.g., BCU 20) authorizing the SOC level to be modified depending on the nature of the signal provided. It will be appreciated that devices other than "switches," such as sensors, computer interfaces and other input devices, may also be used by a vehicle operator to provide an indication of the vehicle operating state or intended vehicle operating state.

In another embodiment of the present invention, HVCU 22, BCU 20 or another vehicle controller may be operated to determine whether to modify the SOC level based on one or more vehicle operating parameters, such as, for example, engine speed, vehicle speed and rate of energy depletion in battery 12. The SOC level may be modified, for instance, when the vehicle has been stationary for more than a predetermined period of time or when the internal combustion engine has been turned off. In this embodiment, detecting arrangement 30 may include the sensor(s) used to measure the vehicle operating parameter(s) and any controllers (e.g., HVCU 22 or BCU 20) used in conjunction with these sensor(s) to determine whether the SOC level should be modified.

HVCU 22, BCU 20 and/or other controller(s) may also be used to set a target SOC level of the battery based on the vehicle operating state or the intended vehicle operating state. The target setting controller may include characteristic maps, tables, control logic or other arrangement operable to set a target state of charge level based on a vehicle operating state or intended vehicle operating state.

Figure 3A:
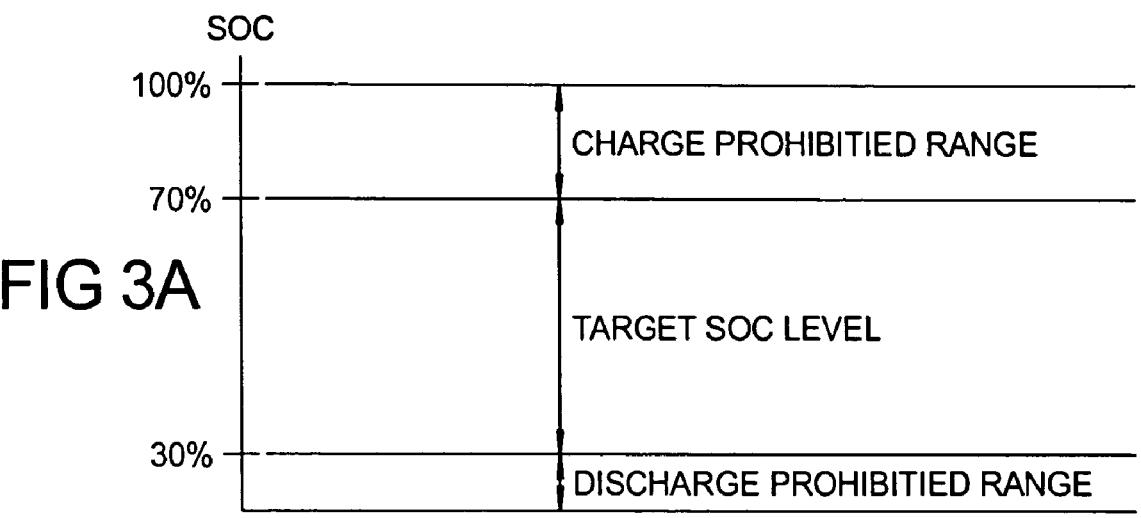
FIGS. 3A-3C are diagrams showing examples of SOC level variation in different operating states of a hybrid vehicle.
Figure 3B:
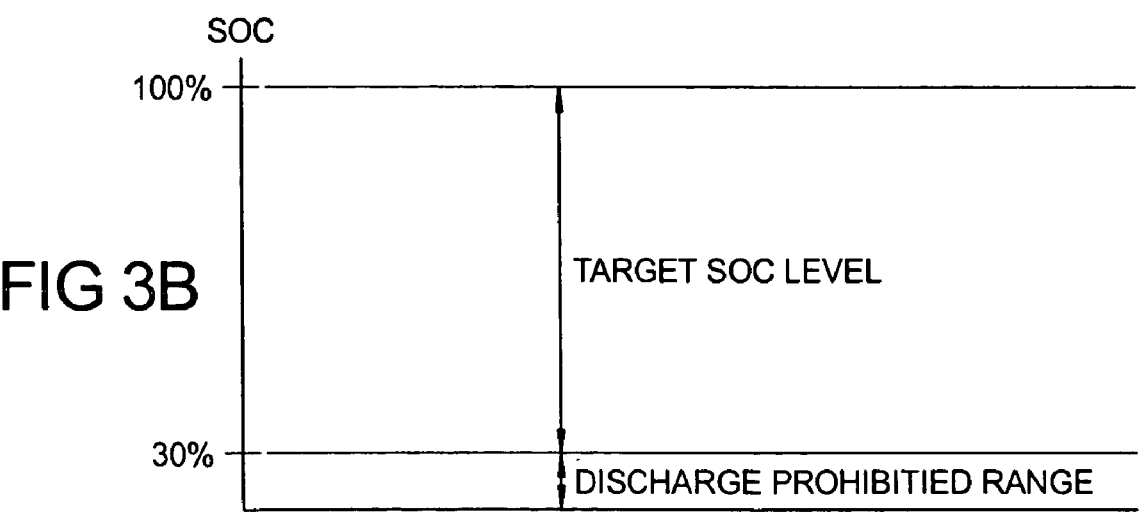

A method of operating the battery control system 10 according to an embodiment present invention will now be described with reference to FIG. 2. In an embodiment, a vehicle operating state or an intended vehicle operating state is determined at step S40. If it is determined that the vehicle is operating in a mobile vehicle operating state (S42), then it is determined whether or not a stationary vehicle operating state is anticipated (S44). If a stationary vehicle operating state is not anticipated, then the target SOC level may be set at a normal SOC level at step S46 (see, e.g., FIG. 3A which illustrates a normal SOC level in the range of about 30-70%), which facilitates extended battery life under the relatively high charge and discharge currents required by the drive motor and leaves room for additional energy recovery during the mobile vehicle operating state. However, if a stationary vehicle operating state is anticipated, then the target SOC level may be set at a modified SOC level at step S48 (see, e.g., FIG. 3B which illustrates a modified SOC level in the range of about 30-100%).

Figure 3C:
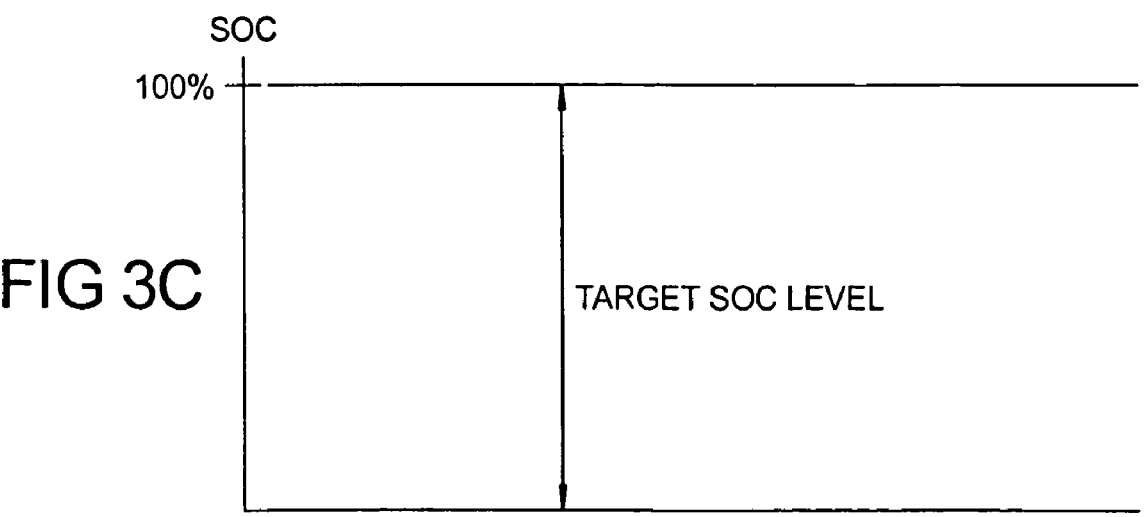

Alternatively, if it is determined that the vehicle is not operating in a mobile vehicle operating state (S42), then the target SOC level is set at a modified SOC level at step S50 (see, e.g., FIG. 3C which illustrates a modified SOC level up to 100% for a stationary vehicle operating state). As noted above, this feature enables more electrical energy to be stored in and discharged from a given size battery, and reduces the need to start the internal combustion engine to drive the motor-generator 26 to charge battery 12.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A battery control system for controlling a state of charge of a hybrid vehicle battery, comprising:
    a detecting arrangement for determining a vehicle operating state or an intended vehicle operating state; and
    a controller for setting a target state of charge level of the battery based on the vehicle operating state or the intended vehicle operating state, wherein the controller is operable to set a target state of charge level at a first level during a mobile vehicle operating state and at a second level during a stationary vehicle operating state and in anticipation of the vehicle operating in the stationary vehicle operating state; and the second level is closer than the first level to an upper limit of a maximum state of charge,
    wherein the stationary vehicle operating state comprises an engine-off state with the battery configured for an increased capacity to supply electrical power to on-board or off-board equipment.

2. The battery control system of claim 1, wherein the first level includes a state of charge in a normally charged range of the battery.

3. The battery control system of claim 1, wherein the first level includes a state of charge in a range of about 30% to about 70%.

4. The battery control system of claim 1, wherein the second level includes a state of charge in a range of about 30% to about 100%.

5. The battery control system of claim 1, wherein the second level includes a state of charge up to 100%.

6. A battery control system for controlling a state of charge of a hybrid vehicle battery, comprising:
    operating state determining means for determining a vehicle operating state or an intended vehicle operating state; and
    target level setting means for setting a target state of charge level of the battery based on the vehicle operating state or the intended vehicle operating state, wherein the target level setting means is operable to set a target state of charge level at a first level during a mobile vehicle operating state and at a second level during a stationary vehicle operating state and in anticipation of the vehicle operating in the stationary vehicle operating state and the second level is closer than the first level to an upper limit of a maximum state of charge
    wherein the stationary vehicle operating state comprises an engine-off state with the battery configured for an increased capacity to supply electrical power to on-board or off-board equipment.

7. The battery control system of claim 6, wherein the first level includes a state of charge in a normally charged range of the battery.

8. The battery control system of claim 6, wherein the first level includes a state of charge in a range of about 30% to about 70%.

9. The battery control system of claim 6, wherein the second level includes a state of charge in a range of about 30% to about 100%.

10. The battery control system of claim 6, wherein the second level includes a state of charge up to 100%.

11. A method for controlling a state of charge of a hybrid vehicle battery, comprising:
    determining a vehicle operating state or an intended vehicle operating state; and
    setting a target state of charge level of the battery based on the vehicle operating state or the intended vehicle operating state, wherein the step of setting a target state of charge level includes setting a target state of charge level at a first level during a mobile vehicle operating state and at a second level during a stationary vehicle operating state and in anticipation of the vehicle operating in the stationary vehicle operating state, and the second level is closer than the first level to an upper limit of a maximum state of charge,
    wherein the stationary vehicle operating state comprises an engine-off state with the battery configured for an increased capacity to supply electrical power to on-board or off-board equipment.

12. The battery control system of claim 11 further including the step of setting the first level at a normally charged range of the battery.

13. The battery control system of claim 11 further including the step of setting the first level at a state of charge in a range of about 30% to about 70%.

14. The battery control system of claim 11 further including the step of setting the second level closer than the first level to an upper limit of a maximum state of charge.

15. The battery control system of claim 11 further including the step of setting the second level at a state of charge in a range of about 30% to about 100%.

16. The battery control system of claim 11 further including the step of setting the second level at a state of charge up to 100%.

* * * * *